United States Patent [19]

Dalhuisen

[11] Patent Number: 4,632,954
[45] Date of Patent: Dec. 30, 1986

[54] HALOGEN-CONTAINING RUBBERS AND A METHOD FOR THEIR MANUFACTURE

[75] Inventor: Albert J. Dalhuisen, Sunnyvale, Calif.

[73] Assignee: Calgon Corporation, Pittsburgh, Pa.

[21] Appl. No.: 749,260

[22] Filed: Jun. 27, 1985

[51] Int. Cl.$^4$ ................................................ C08K 5/18
[52] U.S. Cl. .................................... 524/240; 524/204; 525/330.8
[58] Field of Search ............... 524/204, 238, 239, 240, 524/241, 242, 243, 244, 245, 246, 247, 248, 249, 250, 288, 291, 395, 396; 525/330.8, 330.9, 331.1, 331.2, 331.3, 331.8, 332.3, 332.4, 326.1, 326.2, 326.3, 326.4, 326.6, 379, 381, 382, 374, 386, 383, 326.5

[56] References Cited

U.S. PATENT DOCUMENTS

| | | | |
|---|---|---|---|
| 1,624,724 | 4/1927 | Elley | 524/249 |
| 2,189,417 | 2/1940 | Craig | 524/240 |
| 2,266,602 | 12/1941 | Howland | 524/240 |
| 2,296,331 | 9/1942 | Bogemann et al. | 524/238 |
| 2,349,733 | 5/1944 | Howland | 524/238 |
| 2,583,527 | 1/1952 | Goppel et al. | 524/396 |
| 2,935,485 | 5/1960 | Reynolds | 524/396 |
| 3,027,351 | 3/1962 | Lichty | 524/240 |
| 3,488,309 | 1/1970 | Cockbain | 524/396 |
| 3,507,825 | 4/1970 | Paris | 524/246 |
| 3,622,549 | 11/1971 | Rener | 525/379 |
| 3,801,517 | 4/1974 | Richwine | 260/2 A |
| 4,146,689 | 3/1979 | Onizawa | 523/332.4 |
| 4,385,147 | 5/1983 | Wirth et al. | 524/240 |
| 4,499,243 | 2/1985 | Radar | 525/382 |

*Primary Examiner*—Veronica P. Hoke
*Attorney, Agent, or Firm*—W. C. Mitchell; R. B. Olson; M. C. Sudol, Jr.

[57] ABSTRACT

This invention is directed to a method of improving the heat aging properties of a halogen-containing rubber comprising adding an effective amount of a compound selected from the group consisting of aromatic amino acids, related compounds, and salts of hydroxy benzoic acid to said halogen-containing rubber prior to vulcanization, and then vulcanizing.

12 Claims, No Drawings

HALOGEN-CONTAINING RUBBERS AND A METHOD FOR THEIR MANUFACTURE

BACKGROUND OF THE INVENTION

This invention relates to improved halogen-containing rubbers and to a method of manufacturing these improved rubbers.

More particularly, this invention relates to the use of aromatic amino acids, salts of aromatic amino acids, esters of aromatic amino acids, amino phenols, salts of hydroxy benzoic acid and other compounds to improve the heat aging properties of halogenated rubbers.

Still more particularly, this invention relates to use of the above-listed compounds to improve the heat aging properties of chloroprene rubbers.

Chloroprene rubbers, also known as polychloroprenes and neoprenes, comprise a family of halogenated synthetic rubbers made by the free radical initiated polymerization of chloroprene. Members of the chloroprene rubber family are known for their resistance to solvents and as having excellent high temperature stability.

Processes for curing (i.e., vulcanizing) chloroprene rubbers are well known in the art. For example, vulcanization of chloroprene rubber is generally accomplished under pressure and at elevated temperatures using metal oxides, such as magnesium oxide, zinc oxide, and lead oxide, alone or in combination. These oxides, especially zinc oxide, are thought to catalyze the vulcanization reaction. Also, they regulate scorch (i.e., premature vulcanization) and cure rate. Of the many oxide combinations possible, it is generally recognized that combinations of magnesium oxide and zinc oxide are preferred. This combination produces high vulcanizate quality, in terms of heat aging, scorch resistance, tensile strength and coloribility, without unduly lengthening cure rates. Lead oxides are often used to improve water resistance.

The use of accelerators in combination with oxides is also known. Commonly used accelerators include thiourea accelerators, such as ethylenethiourea, diethylthiourea and dibutylthiourea, alone or in combination with accelerators such as tetramethylthiuram disulfide, tetramethylthiuram monosulfide, di-ortho-tolyl-guanidine and benzothiazyl disulfide. An excellent summary of chloroprene rubber curing systems is "Curing Systems for Neoprene", by S. W. Schmitt, which is available as technical paper NP-300.1(Ra) from DuPont.

Aside from the curing of chloroprene rubbers, many additives are known in the art as chloroprene rubber processing aids. For example, stearic acid is used to minimize the sticking of mill rolls and as an internal stock lubricant; low molecular weight polyethylenes are used as mold release agents and to improve extrudability; clays and carbon black are used as reinforcing fillers; Octamine, which is a reaction product of diphenyl-amine and diisobutylene, is used as an antioxidant; and process oils are used as plasticizers. Additionally, sulfur is used as a vulcanizing aid, and N,N-m-phenylene dimaleimide is used as a curing aid. Processing aids and their uses are summarized in "Processing Aids for Chloroprene", by S. W. Schmitt, available from DuPont as technical bulletin N.P.-350.1.

One key rubber property is its tendency to become scorchy. Scorching, as used herein, is defined as premature vulcanization. Scorch is typically correlated to Mooney viscosity measurements taken before and after bin aging of unvulcanized chloroprene rubbers. For example, unvulcanized rubber may be aged at a designated temperature for a specified length of time. Mooney viscosity measurements, before and after bin aging, indicate whether scorching has occurred. Ideally, the Mooney viscosity of a rubber compound will not change over the course of bin aging.

Mooney viscosity values are typically measured in accordance with ASTM test method D1646.

A second key rubber property is its heat stability. The industry has long sought methods of improving the heat aging properties of rubbers. Heat aging relates to the deterioration of vulcanized rubber under high temperature aging conditions. Thus, rubber specimens having known physical properties are subjected to the deteriorating influence of high temperature for standard periods of time. The specimens are generally exposed to circulating hot air at atmospheric pressure. The properties typically measured to determine deterioration include modulus, tensile strength, ultimate elongation and hardness. Thus, changes in these properties indicate the undesirable effects of heat aging. Heat aging tests on chloroprene rubbers are typically conducted in accordance with ASTM test method D865.

Halogenated rubbers, especially chloroprene rubbers, having improved heat aging characteristics would constitute a notable advance in the art. Accordingly, one object of this invention is to offer halogenated rubbers, especially chloroprene rubbers, having improved heat aging qualities.

A further object of this invention to provide a method for manufacturing these improved rubbers.

These and other objects of this invention have been accomplished by the addition of designated compounds to standard halogenated rubber formulations. Thus, the inventor has discovered that, by incorporating additives selected from the group consisting of aromatic amino acids, salts of aromatic amino acids, esters of aromatic amino acids, amino phenols and salts of hydroxy benzoic acid, among others, into halogenated rubbers during compounding, vulcanized products are obtained which have surprising and unexpected heat aging characteristics. These improved rubbers also have acceptable scorch qualities.

This invention greatly expands the versatility of halogenated rubbers, especially chloroprene rubbers. In certain applications, the utility of vulcanized chloroprenes is limited by their heat stability. The additives of this invention improve heat aging characteristics, thereby opening new area of application to these treated rubbers.

U.S. Pat. No. 3,027,351 discloses a use of anthranilic acid as an antioxidant in styrene butadiene latexes. Its use as an agent to improve heat aging in halogenated rubbers is not disclosed or suggested. Halogen-containing rubbers are distinct from styrene butadiene rubbers in chemical structure, vulcanization mechanism and physical properties.

DETAILED DESCRIPTION OF THE INVENTION

The instant invention is directed to a method of improving the heat aging properties of halogen-containing rubbers comprising adding an effective amount of a compound selected from the group consisting of aromatic amino acids, salts of aromatic amino acids, esters of aromatic amino acids, amino phenols, amino benzoic acids, salts of amino benzoic acids, esters of amino benzoic acids, amino naphthoic acids, salts of amino naphthoic acids, esters of amino naphthoic acids, halogen substituted aromatic amino acids, halogen substituted salts of aromatic amino acids, halogen substituted esters of aromatic amino acids, halogen substituted amino benzoic acids, halogen substituted salts of amino benzoic acids, halogen substituted esters of amino benzoic acids, halogen substituted amino naphthoic acids, halogen substituted salts of amino naphthoic acids, halogen substituted esters of amino naphthoic acids, amino phenyl alkyl carboxylic acids, amino phenyl alkyl carboxylic acid salts, esters of amino phenyl alkyl carboxylic acids, halogen substituted amino phenyl alkyl carboxylic acids, halogen substituted amino phenyl alkyl carboxylic acid salts, halogen substituted esters of amino phenyl alkyl carboxylic acids, corresponding diphenyl compounds, and salts of hydroxy benzoic acid to said halogen-containing rubber prior to vulcanization, and then vulcanizing. As an example of an aromatic amino acid, anthranilic acid can be used. Aromatic amino groups include primary amino groups and alkyl-substituted secondary and tertiary aromatic amino groups.

The instant invention is also directed to an improved composition for producing a vulcanized halogen-containing rubber having improved heat aging qualities comprising: (a) an unvulcanized halogen-containing rubber, and (b) a compound selected from the group consisting of aromatic amino acids, salts of aromatic amino acids, esters of aromatic amino acids, amino phenols, amino benzoic acids, salts of amino benzoic acids, esters of amino benzoic acids, amino naphthoic acids, salts of amino naphthoic acids, esters of amino naphthoic acids, halogen substituted aromatic amino acids, halogen substituted salts of aromatic amino acids, halogen substituted esters of aromatic amino acids, halogen substituted amino benzoic acids, halogen substituted salts of amino benzoic acids, halogen substituted esters of amino benzoic acids, halogen substituted amino naphthoic acids, halogen substituted salts of amino naphthoic acids, halogen substituted esters of amino naphthoic acids, amino phenyl alkyl carboxylic acids, amino phenyl alkyl carboxylic acid salts, esters of amino phenyl alkyl carboxylic acids, halogen substituted amino phenyl alkyl carboxylic acids, halogen substituted amino phenyl alkyl carboxylic acid salts, halogen substituted esters of amino phenyl alkyl carboxylic acids, corresponding diphenyl compounds, and salts of hydroxy benzoic acid; wherein said compound is added at a dosage of at least 0.01 part, by weight, based on the weight of said unvulcanized halogen-containing rubber.

The instant invention is also directed to an improved vulcanized halogen-containing rubber, which contains at least 0.01 part, by weight, per 100 parts of halogen-containing rubber, of a compound selected from the group consisting of aromatic amino acids, salts of amino aromatic amino acids, esters of aromatic amino acids, amino phenols, amino benzoic acids, salts of amino benzoic acids, esters of amino benzoic acids, amino naphthoic acids, salts of amino naphthoic acids, esters of amino naphthoic acids, halogen substituted aromatic amino acids, halogen substituted salts of aromatic amino acids, halogen substituted esters of aromatic amino acids, halogen substituted amino benzoic acids, halogen substituted salts of amino benzoic acids, halogen substituted esters of amino benzoic acids, halogen substituted amino naphthoic acids, halogen substituted salts of amino naphthoic acids, halogen substituted esters of amino naphthoic acids, amino phenyl alkyl carboxylic acids, amino phenyl alkyl carboxylic acid salts, esters of amino phenyl alkyl carboxylic acids, halogen substituted amino phenyl alkyl carboxylic acids, halogen substituted amino phenyl alkyl carboxylic acid salts, halogen substituted esters of amino phenyl alkyl carboxylic acids, corresponding diphenyl compounds, and salts of hydroxy benzoic acid.

Any halogen-containing rubber can be used. Halogen-containing rubbers include: chloroprene rubbers, chlorinated high density polyethylene, chloro and bromo butyl rubbers, chlorosulfonated polyethylene rubbers, flourocarbon rubbers and epichlorohydrin rubbers.

For purposes of this application, chloroprene rubbers are used to illustrate the invention. The terms chloroprene rubber, polychloroprene and Neoprene are synonymous. For example, polychloroprenes such as Neoprene GNA, Neoprene W, Neoprene WM-1, Neoprene WHV-100 and Neoprene WHV, available from DuPont, the Baypren chloroprene rubbers available from Bayer and the Skyprene chloroprene rubbers available from Toyosoto can be used. These chloroprene rubbers have wide ranging physical properties in terms of molecular weight, scorchiness, heat aging, modulus, and hardness, depending on monomer conversion, the presence of other monomers and polymerization conditions.

Vulcanization, or curing, is the crosslinking reaction of chloroprene rubber which changes a thermoplastic polymer gradually into an elastic, thermoset product. Commonly used vulcanizing agents include but are not limited to metal oxides such as magnesium oxide, zinc oxide, and lead oxide.

Scorching is defined as premature vulcanization. Magnesium oxide is commonly used as an antiscorching agent. Combinations of zinc oxide and magnesium oxide are especially effective as curing agents.

Antioxidants are essential in all chloroprene formulations. These agents, which give the vulcanizate good heat aging qualities, include but are not limited to phenyl-alpha-naphthylamine or the reaction product of diphenyl-amine and diisobutylene.

Other compounding ingredients which may be used during compounding of chloroprene rubbers include but are not limited to lubricants, plasticizers and fillers. Commonly used lubricants include but are not limited to stearic acid and low molecular weight polyethylene. Plasticizers, which are used to improve the processing and handling characteristics of nonvulcanized neoprene mixtures, include but are not limited to process oils, naphthenic-like process oils, aromatic mineral oils, esters such as dioctyl sebacate, butyl oleate and trioctyl phosphate, resinous plasticizers such as coumarone-indene resins and coal tar derivatives, and unsaturated vegetable oils. Plasticizer choice depends upon end use of the vulcanized product. Plasticizers also allow the use of fillers. Reinforcing fillers improve the tensile strength and tear resistance of chloroprene vulcanizates. Typical reinforcing fillers include clays and carbon black. Also, fine particle calcium carbonate can be used as a filler, alone or in combination with clays and carbon black.

Typical accelerators, which speed the vulcanization reaction, include but are not limited to ethylene thiourea, 2,2-di-benzothiazyl disulfide, di-ortho-tolylguanidine, tetramethylthiuram disulfide, tetramethylthiurammonosulfide and di-ortho-tolyguanidine salt of dicatechol borate.

The physical properties of vulcanized chloroprene rubbers can vary widely depending on the choice of the starting chloroprene polymer and the other components of the chloroprene rubber formulation.

A typical chloroprene rubber formulation is shown below.

| Ingredient | Parts per 100 | Purpose |
| --- | --- | --- |
| Neoprene, GNA type | 100 | synthetic rubber |
| Stearic acid | 0.5 | lubricant |
| Magnesium oxide | 4.0 | scorch inhibitor |
| Octamine | 2 | antioxidant |
| Carbon black, SRF | 60 | filler |
| Oil, LPO (LPO means light processing oil) | 10 | plasticizer |
| Zinc oxide | 5 | vulcanizing agent |

These agents are listed in order of addition to a typical operating rubber mill, wherein they are compounded.

Most chloroprene rubber formulations are milled so as to minimize temperature and cycle times. This minimizes the danger of scorch (i.e., premature vulcanization).

As used herein, the term 'effective amount' of additives means that amount which effectuates the desired characteristic in a given halogenated rubber. For example, an effective amount of the instant additives for improving heat aging is that amount which reduces undesirable heat aging effects.

The key to this invention relates to the addition of designated compounds to halogen-containing rubber formulations prior to vulcanization, thereby improving the heat aging properties of the vulcanized product. The compounds which were discovered by the inventor to improve the heat aging properties of halogen-containing rubbers include those selected from the group consisting of aromatic amino acids, salts of aromatic amino acids, esters of aromatic amino acids, amino phenols, amino benzoic acids, salts of amino benzoic acids, esters of amino benzoic acids, amino naphthoic acids, salts of amino naphthoic acids, esters of amino naphthoic acids, halogen substituted aromatic amino acids, halogen substituted salts of aromatic amino acids, halogen substituted esters of aromatic amino acids, halogen substituted amino benzoic acids, halogen substituted salts of amino benzoic acids, halogen substituted esters of amino benzoic acids, halogen substituted amino naphthoic acids, halogen substituted salts of amino naphthoic acids, halogen substituted esters of amino naphthoic acids, amino phenyl alkyl carboxylic acids, amino phenyl alkyl carboxylic acid salts, esters of amino phenyl alkyl carboxylic acids, halogen substituted amino phenyl alkyl carboxylic acids, halogen substituted amino phenyl alkyl carboxylic acid salts, halogen substituted esters of amino phenyl alkyl carboxylic acids, corresponding diphenyl compounds, and salts of hydroxy benzoic acid.

Thus, before or during the milling step wherein a rubber formulation is compounded, one or more of the above-listed compounds is added to the unvulcanized halogen-containing rubber with the other additives comprising the rubber formulation (i.e. lubricants, scorch inhibitors, plasticizers, fillers, etc.). The milled admixture is then vulcanized.

Structurally, compounds which may be used to improve the heat aging properties of halogen-containing rubbers include but are not limited to:

A. Compounds having the following structures:

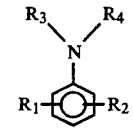   I.

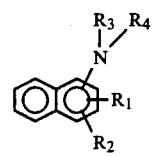   II.

Where:
$R_1$ = —OH
or —COOH
or —(CH$_2$)$_x$—COOH     x = 1–15
or —COO(CH$_2$)$_y$—CH$_3$   y = 0–15
or —(CH$_2$)$_x$—COO(CH$_2$)$_y$—CH$_3$
or —COOM$_1$           M$_1$ = —alkali
or —(CH$_2$)$_x$—COOM$_1$     metals or —NH$_4$
$R_2$ = —H, —CH$_3$, or —(CH$_2$)$_z$CH$_3$   z = 1–15
or —Halogen
or —OH
or —NH$_2$
or —NO$_2$
$R_3$ = —H, —CH$_3$ or —(CH$_2$)$_w$CH$_3$   w = 1–5
$R_4$ = —H, —CH$_3$ or —(CH$_2$)$_w$CH$_3$ B. Compounds having the following structures:

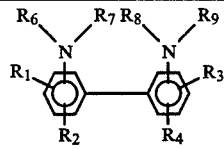   III.

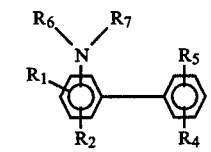   IV.

Where
$R_1$ = —OH
or —COOH
or —(CH$_2$)$_x$—COOH     x = 1–15
or —COO(CH$_2$)$_y$—CH$_3$   y = 0–15
or —(CH$_2$)$_x$—COO(CH$_2$)$_y$—CH$_3$
or —COOM$_1$           M$_1$ = —alkali
or —(CH$_2$)$_x$—COOM$_1$     metals or —NH$_4$
$R_2$ = —H, —CH$_3$, or —(CH$_2$)$_z$CH$_3$   z = 1–15
or —Halogen
or —OH
or —NH$_2$
or —NO$_2$
$R_3$ = —OH
or —COOH
or —(CH$_2$)$_x$—COOH     x = 1–15
or —COO(CH$_2$)$_y$—CH$_3$   y = 0–15
or —(CH$_2$)$_x$—COO(CH$_2$)$_y$—CH$_3$
or —COOM$_1$           M$_1$ = —alkali
or —(CH$_2$)$_x$—COOM$_1$     metals or —NH$_4$
$R_4$ = —H, —CH$_3$, or —(CH$_2$)$_z$CH$_3$   z = 1–15
or —Halogen
or —OH
or —NH$_2$
or —NO$_2$
$R_5$ = —H, —CH$_3$, or —(CH$_2$)$_z$CH$_3$   z = 1–15
or —OH
or —COOH
or —(CH$_2$)$_x$—COOH     x = 1–15
or —COO(CH$_2$)$_y$—CH$_3$   y = 0–15

-continued or —(CH$_2$)$_x$—COO(CH$_2$)$_y$—CH$_3$
or —COOM$_1$
or —(CH$_2$)$_x$—COOM$_1$   M$_1$ = —alkali metals or —NH$_4$
R$_6$ = —H, —CH$_3$, or —(CH$_2$)$_w$CH$_3$   w = 1-5
R$_7$ = —H, —CH$_3$, or —(CH$_2$)$_w$CH$_3$
R$_8$ = —H, —CH$_3$, or —(CH$_2$)$_w$CH$_3$
R$_9$ = —H, —CH$_3$, or —(CH$_2$)$_w$CH$_3$ C. Compounds having the following structures:

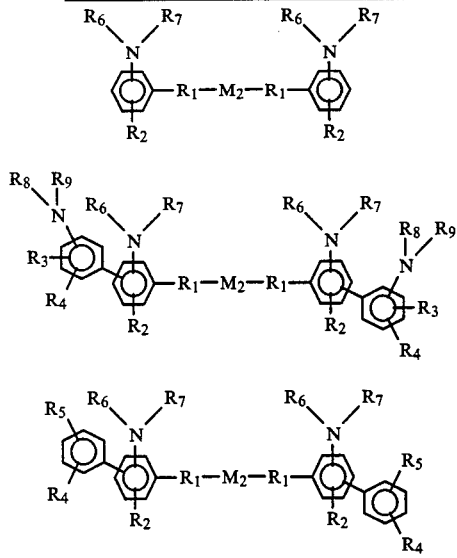

V.

VI.

VII.

Where:
M$_2$ = -elements of Groups IIA, and IIB of the Periodic Table-,
—Fe—, —Cu—, —Sn—, —Pb—, or —Al(OH)—
R$_1$ = —COO—   x = 1-15
or —(CH$_2$)$_x$—COO—
R$_2$ = —H, —CH$_3$, or —(CH$_2$)$_z$CH$_3$   z = 1-15
or —Halogen
or —OH
or —NH$_2$
or —NO$_2$
R$_3$ = —OH
or —COOH
or —(CH$_2$)$_x$—COOH   x = 1-15
or —COO(CH$_2$)$_y$—CH$_3$   y = 0-15
or —(CH$_2$)$_x$—COO(CH$_2$)$_y$—CH$_3$
or —COOM$_1$   M$_1$ = —alkali metals or —NH$_4$
or —(CH$_2$)$_x$—COOM$_1$
R$_4$ = —H, —CH$_3$, or —(CH$_2$)$_z$CH$_3$   z = 1-15
or —Halogen
or —OH
or —NH$_2$
or —NO$_2$
R$_5$ = —H, CH$_3$, or —(CH$_2$)$_z$CH$_3$   z = 1-=15
or —OH
or —COOH
or —(CH$_2$)$_x$—COOH   x = 1-15
or —COO(CH$_2$)$_y$—CH$_3$   y = 0-15
or —(CH$_2$)$_x$—COO(CH$_2$)$_y$—CH$_3$
or —COOM$_1$   M$_1$ = —alkali metals or —NH$_4$
or —(CH$_2$)$_x$—COOM$_1$   w = 1-5
R$_6$ = —H, —CH$_3$, or —(CH$_2$)$_w$CH$_3$
R$_7$ = —H, —CH$_3$, or —(CH$_2$)$_w$CH$_3$
R$_8$ = —H, —CH$_3$, or —(CH$_2$)$_w$CH$_3$
R$_9$ = —H, —CH$_3$, or —(CH$_2$)$_w$CH$_3$ D. Compounds having the following structures:

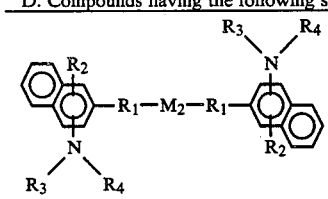

VIII.

-continued

Where:
M$_2$ = -elements of Groups IIA and IIB of the Periodic Table-, —Fe—, —Cu—, —Sn—, —Pb—, —Al(OH)—
R$_1$ = —COO—   x = 1-15
or —(CH$_2$)$_x$—COO—
R$_2$ = —H, —CH$_3$, or —(CH$_2$)$_z$CH$_3$   z = 1-15
or —Halogen
or —OH
or —NH$_2$ or —NO$_2$
R$_3$ = —H, —CH$_3$, or —(CH$_2$)$_w$CH$_3$   w = 1-5
R$_4$ = —H, —CH$_3$, or —(CH$_2$)$_w$CH$_3$ E. Compounds having the following structures:

IX.

X.

XI.

Where:
M$_3$ = Al, or Fe
R$_1$ = —COO—   x = 1-15
or —(CH$_2$)$_x$—COO—
R$_2$ = —H, —CH$_3$, or —(CH$_2$)$_z$CH$_3$   z = 1-15
or —Halogen
or —OH
or —NH$_2$
or —NO$_2$
R$_3$ = —OH
or —COOH
or —(CH$_2$)$_x$—COOH   x = 1-15
or —COO(CH$_2$)$_y$—CH$_3$   y = 0-15
or —(CH$_2$)$_x$—COO(CH$_2$)$_y$—CH$_3$
or —COOM$_1$   M$_1$ = —alkali metals or —NH$_4$
or —(CH$_2$)$_x$—COOM$_1$
R$_4$ = —H, —CH$_3$, or —(CH$_2$)$_z$CH$_3$   z = 1-15
or —Halogen -continued or —OH
or —NH$_2$
or —NO$_2$ $R_5$ = —H, —CH$_3$, or —(CH$_2$)$_z$CH$_3$     $z = 1-=15$
or —OH
or —COOH
or —(CH$_2$)$_x$—COOH     $x = 1-15$
or —COO(CH$_2$)$_y$—CH$_3$     $y = 0-15$
or —(CH$_2$)$_x$—COO(CH$_2$)$_y$—CH$_3$
or —COOM$_1$     $M_1$ = —alkali metals or —NH$_4$
or —(CH$_2$)$_x$—COOM$_1$ $R_6$ = —H, —CH$_3$, or —(CH$_2$)$_w$CH$_3$     $w = 1-5$
$R_7$ = —H, —CH$_3$, or —(CH$_2$)$_w$CH$_3$
$R_8$ = —H, —CH$_3$, or —(CH$_2$)$_w$CH$_3$
$R_9$ = —H, —CH$_3$, or —(CH$_2$)$_w$CH$_3$ F. Compounds having the following structure:

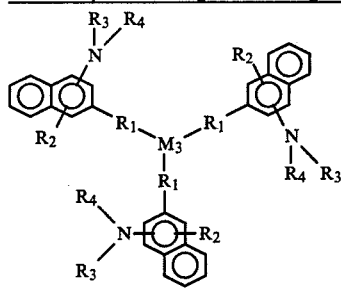

XII.

Where:
$M_3$ = Al, or Fe
$R_1$ = —COO—
or —(CH$_2$)$_x$—COO—     $x = 1-15$
$R_2$ = —H, —CH$_3$, or —(CH$_2$)$_z$CH$_3$     $z = 1-15$
or —Halogen
or —OH
or —NH$_2$
or —NO$_2$
$R_3$ = —H, —CH$_3$, or —(CH$_2$)$_w$CH$_3$     $w = 1-5$
$R_4$ = —H, —CH$_3$, or —(CH$_2$)$_w$CH$_3$ G. Compounds having the following structure:

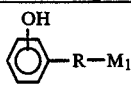

XIII.

Where:
$M_1$ = —alkali metals, or —NH$_4$
R = —COO—, or —(CH$_2$)$_x$—COO—     $x = 1-15$ H. Compounds having the following structure:

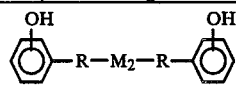

XIV.

Where:
$M_2$ = -elements of Groups IIA and IIB of the Periodic Table-, —Fe—, —Cu—, —Sn—, —Pb—, or —Al(OH)—
R = —C))—, or —(CH$_2$)$_x$—COO—     $x = 1-15$ and I. Compounds having the following structure:

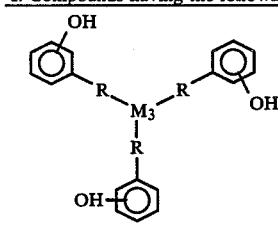

XV.

Where:
$M_3$ = Al or Fe

-continued
R = —COO—, or —(CH$_2$)$_x$—COO—     $x = 1-15$

Preferred compounds which improve the heat aging properties of halogen-containing rubbers are selected from the group consisting of anthranilic acid(o-aminobenzoic acid), m-aminobenzoic acid, p-aminobenzoic acid, 2-amino-4 chlorobenzoic acid, p-aminophenyl acetic acid, amino phenol, ethyl ester of aminobenzoic acid, 3-amino-2-naphthoic acid, ethyl ester of p-aminobenzoic acid, sodium-p-aminobenzoate, magnesium p-aminobenzoate, magnesium salicylate, zinc salicylate, calcium p-aminobenzoate, zinc p-aminobenzoate, 4,4-diamino-1,1-diphenyl-3,3-dicarboxylic acid and its sodium salt.

The most preferred compounds are selected from the group consisting of anthranilic acid, p-aminobenzoic acid, m-aminobenzoic acid, p-aminophenyl acetic acid, magnesium p-aminobenzoate and sodium p-aminobenzoate.

Any form of the instant additives can be used. For example, anthranilic acid powder can be used or a 25% admixture of anthranilic acid and a light processing oil can be used. The latter option is an example of the preferred method of adding the instant compounds to halogen-containing rubber compositions. It is especially beneficial to use a 10–25%, by weight, dispersion in processing oil, especially if a processing oil is already being used as a plasticizer. This method is preferred because the applicant has found that the addition of powdered compounds disperse slowly, which results in low tensile strength and reduced ultimate elongation.

The compounds within the scope of this invention can be added to the halogen-containing rubber composition by any convenient method. Thus, these products, depending on their form, can be added to the system via dumping, pump, gravity flow, etc., either before or during the milling step. They can be added alone or in combination with other additives.

The above defined compounds should be added at a dosage of at least 0.01 part per 100 parts halogen-containing rubber based on the total weight of the rubber in the formulation being compounded. The preferred dosage is from 0.1 part to 100 parts, based on the total weight of the rubber in the formulation being compounded. The most preferred dosage is from 0.1 part to 10 parts per 100 parts rubber, based on the total weight of the halogen-containing rubber in the formulation being compounded.

This invention encompasses use of the above defined heat aging additives in any halogen-containing rubber composition, irrespective of other additives in the rubber formulation.

EXAMPLES

The following examples demonstrate the instant invention in chloroprene rubbers. They should in no way be construed as limiting this invention.

Throughout the examples, certain tests are used to measure the physical properties of chloroprene rubber. These tests are described below:

Heat Aging

This test estimates the deterioration of the physical properties of chloroprene rubber by heating vulcanized rubber samples in a test tube for a designated time at a standardized and constant temperature. Thus, the relative resistance of vulcanized rubbers to high temperature aging can be measured by comparison of the physical properties of the rubbers being tested before and after heat aging. In the examples, heat aging was carried out in accordance with ASTM Test Method D865-62 (Reapproved 1974), Titled "Rubber Deterioration by Heating in a Test Tube", which is hereby incorporated by reference into this application. Typical tests are run 3 or 5 days at 121° C.

Mooney Viscosities

These viscosities are obtained using shearing disk viscometers operated by standardized conditions. As such, Mooney viscosities may be used as comparative measures of premature vulcanization or scorch, when viscosity comparisons are made before and after bin aging of unvulcanized samples. As vulcanization occurs, Mooney viscosities increase. The times for the viscosity to increase from the minimum viscosity value to the minimum viscosity plus 3 Mooney units ($t_3$), to the minimum viscosity plus 10 Mooney units ($t_{10}$) or from the $t_3$ viscosity to 18 Mooney units ($t_{15}$) are measures of the rate of vulcanization. In the examples, Mooney viscosity measurements were obtained in accordance with ASTM Test Method D1646-80, Titled "Rubber From Natural or Synthetic Sources—Viscosity and Vulcanization Characteristics (Mooney Viscometer)", which is hereby incorporated by reference into this application.

Oscillating Disk Curemeter Test

This test measures the vulcanization characteristics of chloroprene rubbers by oscillating a small disk in a compounded rubber under standardized pressure and temperature conditions. As the rubber vulcanizes, its stiffness increases. Stiffness is proportional to the torque necessary to keep the disk oscillating. In the examples, Oscillating Disk Curemeter Tests were conducted in accordance with ASTM Test Method D2084-79, titled "Rubber Property—Vulcanization Characteristics Using Oscillating Disk Curemeter", which is hereby incorporated by reference into this application. In all tests, maximum torque is selected as the torque after 20 minutes cure time. tHd 2 is the total time to reach a 2 unit increase in torque. $t_c90$ is the total time to reach 90% of maximum torque. $M_c90$ is the torque (lb-in) at $t_c90$. In the examples, the curemeter tests were run at 160° C., using an oscillation arc of 3° and an oscillation speed of 10 cycles/minute.

Scorching

Under ideal circumstances, the properties of an unvulcanized chloroprene rubber do not change during bin aging. In actuality, Mooney viscosity times decrease during bin aging for many chloroprene rubbers. Thus, changes in Mooney times can be used to measure scorch, or premature vulcanization.

Stress-Strain Tests

These tests measure the tensile strength at given elongation, the tensile strength, the ultimate elongation and the modulus at a given elongation for the chloroprene rubber being tested. These tests were run in accordance with ASTM Test Method D412-80, titled "Rubber Properties in Tension", which is hereby incorporated by reference into this application. Stress is the force per unit cross sectional area (MPa). Strain is the deformation per unit original length ($\Delta L/L$) and modulus is the stress required for a certain elongation.

Hardness

Hardness measurements of cured rubber products were obtained in accordance with ASTM Test Method D2240-75, which is hereby incorporated by reference into this application.

In the examples, the following products were used:

Neoprene W, which is a general purpose chloroprene rubber, commercially available from DuPont.

Neoprene GNA, which is a sulfur modified chloroprene rubber stabilized with a thiurea disulfide and a staining antioxidant, commercially available from Dupont.

Stearic acid, which is commercially available from VWR Scientific.

Maglite D, which is a commercial grade of magnesium oxide, available from Calgon Corporation, Pittsburgh, Pa.

Octamine antioxidant, which is a reaction product of diphenylamine and diisobutylene, commercially available from Uniroyal Chemical.

Carbon black, type SRF, N774, which is commercially available from Cabot Corporation.

Natka 1200, which is a hard clay commercially available from W. R. Grace & Company.

Circo Light Process Oil, which is commercially available from Sun Refining & Marketing Company.

Protox 166, which is zinc oxide commercially available from The New Jersey Zinc Company.

Spider type sulfur, which is commercially available from C. P. Hall Company.

Di-ortho-tolylguanidine accelerator (DOTG), which is commercially available from American Cyanamid Company.

Tetramethylthiurammonosulfide accelerator (TMTM), which is commercially available from Dupont.

Anthranilic acid, which is commercially available from Sherwin Williams Company.

o-aminophenol (2-amino-1-hydroxybenzene), which is commercially available from Aldrich Chemical Company.

EXAMPLE 1

This example shows the benefits of anthranilic acid on Neoprene W. The anthranilic acid was added as an oil-based dispersion. The following Neoprene formulation was used for this comparison.

| Component | parts, by weight |
| --- | --- |
| Neoprene W | 100 |
| Stearic acid | 0.5 |
| Maglite D | 4 |
| Octamine antioxidant | 2 |
| Carbon black, SRF, N774 | 35 |
| Natka 1200 | 35 |
| Light process oil | 6 |
| Zinc oxide | 5 |
| Sulfur | 0.5 |
| DOTG accelerator (di-ortho-tolyl-guanidine) | 1 |
| TMTM accelerator (tetramethyl thiuram monosulfide | 1 |
| Anthranilic acid* | variable |

*Ball milled dispersion, 25% anthranilic acid, 75% light process oil.

Results of Example 1 are shown in Table 1 below. This table compares the effect of 2 parts, by weight, anthranilic acid on the formulation shown above. Mooney $t_{10}$ scorch times were obtained for unvulcanized samples before and after bin aging for 6 days at 50° C. The Mooney viscosities which were used to obtain the $t_{10}$ times were run at 126.7° C.

The oscillating disk curemeter measurements were obtained at 160° C., using a 3° arc at 10 cycles per minute. The stress-strain and hardness tests were taken after each formulation had been cured at 160° C. for 20 and 25 minutes, and after test tube heat aging for 5 days at 121° C.

TABLE 1

| | Formulation | | | |
|---|---|---|---|---|
| | A | | B | |
| | 0 parts anthranilic acid | | 2 parts anthranilic acid | |
| Mooney scorch $t_{10}$ time (minutes) | | | | |
| Original: | 39 | | 32 | |
| After 6 days bin aging at 50° C.: | 35 | | 28 | |
| Oscillating disk curemeter | | | | |
| $t_c90$ (minutes) | 18 | | 18 | |
| $M_c90$ (ft-lb) | 81 | | 90 | |
| | Cure times @ 160° C. (minutes) | | | |
| | 20 | 25 | 20 | 25 |
| Stress-strain and hardness | | | | |
| Modulus @ 200%, MPa | 6.9 | 6.9 | 8.2 | 8.2 |
| Tensile strength, MPa | 17.4 | 17.3 | 17.8 | 17.2 |
| Ultimate elongation, % | 450 | 440 | 440 | 430 |
| Hardness, Shore A-2 | 74 | 74 | 76 | 76 |
| After test tube heat aging (5 days @ 121° C.) | | | | |
| Modulus @ 200%, Change % | 97 | 87 | 67 | 65 |
| Tensile strength, Change % | −8 | −11 | −7 | −8 |
| Ultimate elongation, Change % | −38 | −37 | −32 | −35 |
| Hardness, Shore A-2, Points Change | 10 | 10 | 9 | 9 |

Table 1 shows that the addition of anthranilic acid to the above-listed rubber formulation improved the tensile modulus and improved the heat aging of vulcanized neoprene. Its use did not significantly alter process safety.

EXAMPLE 2

This example shows the benefits of anthranilic acid on Neoprene GNA. The anthranilic acid was added as a powder. The following Neoprene formulation was used for this comparison.

| Component | parts, by weight |
|---|---|
| Neoprene GNA | 100 |
| Stearic acid | 0.5 |
| Maglite D | 2 |
| Octamine antioxidant | 2 |
| Zinc oxide | 5 |
| Anthranilic acid powder | variable |

It is noteworthy that no carbon black filler and no plasticizer (oil) were used.

Results of Example 2 are shown in Table 2. This table compares the effect of 2 parts, by weight, of anthranilic acid on the above formulation, as measured by stress-strain and hardness tests before and after air test tube aging for 5 days at 121° C. The Mooney scorch $t_{10}$ times for each formulation, measured at 126.7° C., and $M_c90$ readings for each formulation, measured at 160° C., are also shown,

TABLE 2

| | Formulation | |
|---|---|---|
| | A | B |
| | 0 parts anthranilic acid | 2 parts anthranilic acid |
| Mooney scorch $t_{10}$ time (minutes) | | |
| Original: | 33 | 32 |
| Oscillating disk curemeter | | |
| $t_c90$ (minutes) | 7 | 8 |
| $M_c90$ (ft-lb) | 51 | 57 |
| | 20 Minutes cure time @ 160° C. | |
| Stress-strain and hardness | | |
| Modulus @ 200%, MPa | 1.2 | 1.7 |
| Modulus @ 300%, MPa | 1.7 | 2.5 |
| Modulus @ 700%, MPa | 11.1 | 13.8 |
| Tensile strength, MPa | 26.0 | 26.0 |
| Ultimate elongation, % | 860 | 830 |
| Hardness, Shore A-2 | 51 | 55 |
| After test tube heat aging (5 days @ 121° C.) | | |
| Modulus @ 300%, Change % | 96 | 57 |
| Hardness, Shore A-2, Points Change | 7 | 6 |

This example shows that modulus and resistance to heat aging are improved by the addition of anthranilic acid to the formulation.

EXAMPLE 3

This example shows the performance improvements resulting from the use of anthranilic acid in a Neoprene GNA formulation containing carbon black and a light process oil. The anthranilic acid was added, after ball milling, as a dispersion consisting of 25% anthranilic acid and 75% light process oil. The following Neoprene formulation was used for this comparison:

| Component | parts, by weight |
|---|---|
| Neoprene GNA | 100 |
| Stearic acid | 0.5 |
| Maglite D | 2 |
| Octamine antioxidant | 2 |
| Carbon black, SRF, N774 | 60 |
| Light process oil | 10 |
| Zinc oxide | 5 |
| Anthranilic acid | variable |

Results of example 3 are shown in Table 3. This table compares the effect of 3.3 parts, by weight, of anthranilic acid on the above formulation, as measured by stress-strain and hardness tests befoe and after air test tube aging for 5 days at 121° C. As in example 2, Mooney $t_{10}$ times and curemeter $t_c90$ and $M_c90$ values are shown for each formulation. The $t_{10}$ time was measured at 126.7° C. and the curemeter values were obtained at 160° C.

TABLE 3

| | Formulation | |
|---|---|---|
| | A | B |
| | 0 parts anthranilic | 3.3 parts anthranilic |

TABLE 3-continued

|  | acid | acid |
|---|---|---|
| Mooney scorch $t_{10}$ time (minutes) | | |
| Original: | 40 | 32 |
| Oscillaring disk curemeter | | |
| $t_c90$ (minutes) | 14 | 10 |
| $M_c90$ (lb-in) | 81 | 87 |
| | 20 Minutes cure time @ 160° C. | |
| Stress-strain and hardness | | |
| Modulus @ 100%, MPa | 4.6 | 5.2 |
| Tensile strength, MPa | 19.4 | 18.9 |
| Ultimate elongation, % | 320 | 340 |
| Hardness, Shore A-2 | 77 | 80 |
| After test tube heat aqing (5 days @ 121° C.) | | |
| Modulus @ 100%, Change % | 103 | 77 |
| Hardness, Shore A-2, Points Change | 10 | 8 |

This example shows that anthranilic acid improves modulus and heat aging, while accelerating vulcanization.

EXAMPLE 4

This example shows the performance improvements resulting from the use of anthranilic acid in a formulation using hard clay as a filler. The following Neoprene formulation was used for this comparison:

| Component | parts, by weight |
|---|---|
| Neoprene GNA | 100 |
| Stearic acid | 0.5 |
| Maglite D | 2 |
| Octamine antioxidant | 2 |
| Hard clay | 60 |
| Zinc oxide | 5 |
| Anthranilic acid powder | variable |

Results of Example 4 are shown in Table 4. This table compares the effect of 2.0 parts, by weight, of anthranilic acid on the above formulation, as measured by stress-strain, hardness and Mooney scorch $t_{10}$ times, before and after aging. The Mooney $t_{10}$ times were run at 126.7° C. before and after 6 days bin aging at 50° C. The table also shows curemeter $t_c90$ and $M_c90$ values, obtained at 160° C.

TABLE 4

|  | Formulation | |
|---|---|---|
|  | A | B |
|  | 0 parts anthranilic acid | 2 parts anthranilic acid |
| Mooney scorch $t_{10}$ time (minutes) | | |
| Original: | 41 | 30 |
| After 6 days bin aging at 50° C.: | 26 | 19 |
| Oscillating disk curemeter | | |
| $t_c90$ (minutes) | 12 | 8 |
| $M_c90$ (lb-in) | 76 | 83 |
| | 20 Minutes cure time @ 160°C. | |
| Stress-strain and hardness | | |
| Modulus @ 200%, MPa | 5.2 | 6.9 |
| Modulus @ 300%, MPa | 6.2 | 8.1 |
| Tensile strength, MPa | 21.7 | 16.1 |
| Ultimate elongation, % | 800 | 670 |
| Hardness, Shore A-2, | 74 | 76 |
| After test tube heat aging (5 days @ 121° C.) | | |
| Modulus @ 200%, Change % | 88 | 50 |
| Tensile strength, Change % | −34 | −25 |
| Ultimate elongation, Change % | −35 | −46 |
| Hardness, Shore A-2, Points Change | 6 | 6 |

This example shows that the use of anthranilic acid results in increased modulus, improved heat aging and accelerated vulcanization.

EXAMPLE 5

Example 5 shows the performance improvements resulting from the use of anthranilic acid in a formulation using hard clay, carbon black and light process oil. The anthranilic acid was added, after ball milling, as a dispersion consisting of 25% anthranilic acid and 75% light process oil, by weight. The following neoprene formulation was used for this comparison:

| Component | parts, by weight |
|---|---|
| Keoprene GNA | 100 |
| Stearic acid | 0.5 |
| Maglite D | 2 |
| Octamine antioxidant | 2 |
| Carbon black, SRF, N774 | 35 |
| Hard clay | 35 |
| Light process oil | 6 |
| Zinc oxide | 5 |
| Anthranilic acid powder | variable |

Results of Example 5 are shown in Table 5. This table compares the effect of 1.0 part anthranilic acid on the above formulation, as measured by stress-strain, hardness and Mooney scorch $t_{10}$ times, before and after aging. The Mooney $t_{10}$ times were run at 126.7° C., before and after 6 day bin aging at 50° C. The table also shows pre-aging curemeter $t_c90$ and $M_c90$ values, obtained at 160° C.

TABLE 5

|  | Formulation | |
|---|---|---|
|  | A | B |
|  | 0 parts anthranilic acid | 1 part anthranilic acid |
| Mooney scorch $t_{10}$ time (minutes) | | |
| Original: | 41 | 36 |
| After 6 days bin aging at 50° C.: | 33 | 28 |
| Oscillating disk curemeter | | |
| $t_c90$ (minutes) | 15 | 11 |
| $M_c90$ (lb-in) | 86 | 93 |
| | 20 Minutes cure time @ 160° C. | |
| Stress-strain and hardness | | |
| Modulus @ 200%, MPa | 7.6 | 9.0 |
| Modulus @ 300%, MPa | 11.9 | 12.9 |
| Tensile strength, MPa | 18.0 | 17.2 |
| Ultimate elongation, % | 480 | 460 |
| Hardness, Shore A-2 | 77 | 80 |
| After air test tube aging (5 days @ 121° C.) | | |
| Modulus @ 200%, Change % | 82 | 62 |
| Tensile strength, Change % | −12 | −6 |
| Ultimate elongation, Change % | −48 | −45 |
| Hardness, Shore A-2, | 9 | 7 |

TABLE 5-continued

Points Change

This example shows that 1 part anthranilic acid improves modulus and heat aging while accelerating vulcanization.

EXAMPLE 6

This example shows the effects of o-aminophenol on Neoprene properties. The Neoprene formulation of Example 5 was used. O-aminophenol was used at a 1 part, by weight, dosage. The compound was ball milled and added as a dispersion consisting of 25% O-aminophenol and 75% light process oil, by weight.

Results of Example 6 are shown in Table 6 below.

TABLE 6

| | A | B |
|---|---|---|
| | $t_2$ time @ 126.7° C. | |
| Mooney scorch (minutes) | | |
| Original: | 41 | 10 |
| After 6 days bin aging @ 50° C.: | 33 | 7 |
| Oscillating disk curemeter @ 160° C. | | |
| $M_c$90 lb-in | 15 | 9 |
| $t_c$90 minutes | 86 | 92 |
| Stress-strain and hardness (cured 20 minutes @ 160° C.) | | |
| Modulus @ 200%, MPa | 7.6 | 8.9 |
| Mooulus @ 300%, MPa | 11.9 | 13.2 |
| Tensile strength, MPa | 18.0 | 17.5 |
| Ult. elongation, % | 480 | 440 |
| Hardness, Shore A-2 | 77 | 78 |
| After test tube heat aging (5 days @ 121° C.) | | |
| Modulus @ 200%, Change % | 82 | 75 |
| Tensile strength, Change % | −12 | −7 |
| Ult. elongation, Change % | −48 | −48 |
| Hardness, Shore A-2 Points Change | 9 | 9 |

Variable Additive:
A — No additive
B — o-Aminophenol

The performance of anthranilic acid shown in Example 5 can be directly compared to the performance of the compound of Example 6, since identical formulations and dosages were used in both examples.

EXAMPLE 7

This example shows the effects of meta and para isomers of aminobenzoic acid, 2-amino-4-chlorobenzoic acid, p-aminophenylacetic acid and ethyl o-aminobenzoate on chloroprene rubber properties. The rubber formulation of examples 5 and 6 was used. The additives tested were added at a dosage of 1 part, by weight, per 100 parts Neoprene. The compounds tested were added, after ball milling, as dispersions consisting of 25% additive and 75% light process oil, by weight.

The results of Example 7 are shown in Table 7, below.

TABLE 7

| | A | B | C | D | E |
|---|---|---|---|---|---|
| Stress strain and hardness, cured 20 minutes at 160° C. | | | | | |
| Modulus @ 200%, MPa | 11.1 | 10.1 | 8.9 | 11.4 | 6.9 |
| Modulus @ 300%, MPa | 15.0 | 13.9 | 12.8 | 15.2 | 11.0 |

TABLE 7-continued

| | A | B | C | D | E |
|---|---|---|---|---|---|
| MPa | | | | | |
| Tensile strength, MPa | 17.7 | 17.2 | 17.5 | 18.1 | 17.2 |
| Ult. elongation, % | 430 | 440 | 500 | 420 | 500 |
| Hardness, Shore A-2 | 81 | 82 | 79 | 80 | 76 |
| After test tube heat aging (5 days at 121° C.) | | | | | |
| Modulus @ 200% Change % | 41 | 49 | 50 | 39 | 73 |
| Tensile strength, Change % | −5 | −4 | −8 | −6 | −11 |
| Ult. elongation, Change % | −45 | −44 | −44 | −45 | −36 |
| Hardness, Shore A-2, Points Cnange | 7 | 9 | 8 | 8 | 8 |

The same Neoprene formulation, and the same test conditions, were used in this Example as in Examples 5 and 6. Thus, the performance of the test compounds in this example can be directly compared with the results of Examples 5 and 6.

Example 7 shows that:
1. m-Aminobenzoic acid results in an improved neoprene compound with higher modulus and better heat aging resistance than the control compound without additive.
2. p-Aminobenzoic acid results in an improved neoprene compound, because of increased modulus and improved heat aging resistance.
3. 2-Amino-4-chlorobenzoic acid results in increased modulus and improved heat aging resistance, similar to anthranilic acid.
4. p-Aminophenylacetic acid in neoprene results in increased modulus and improved neoprene heat stability.
5. Ethyl o-aminobenzoate results in a lower modulus than the control compound without additive. It has slightly better heat aging stability than the control (without an additive).

EXAMPLE 8

This example shows the effects 3-amino-2-naphthoic acid, and ethyl p-amino benzoate on chloroprene rubber properties. The rubber formulation of Examples 5, 6 and 7 was used. The 3-amino-2-naphthoic acid was added at a dosage of 2 parts, and the ethyl p-aminoebnzoate was used at a dosage of 1 part, by weight.

Since ethyl p-amino benzoate is a liquid, it was added directly to the formulation. 3-Amino-2-naphthoic acid was ball milled and added as dispersions consisting of 25% additive and 75% light process oil, by weight.

The results of Example 8 are shown in Table 8, below.

TABLE 8

| | A | B |
|---|---|---|
| Additive | 3-amino-2-naphthoic acid (@ 2 parts) | Ethyl p-amnobenzoate (@ 1 part) |
| Stress-strain and hardness, cured 20 minutes @ 160° C. | | |
| Modulus @ 200%, MPa | 8.2 | 6.7 |
| Modulus @ 300%, MPa | 12.2 | 10.7 |
| Tensile Strength, MPa | 17.8 | 17.4 |
| Ult Elongation, % | 500 | 520 |
| Hardness, Shore A-2 | 78 | 76 |
| After test tube heat aging (5 days @ 121° C.) | | |
| Modulus @ 200% | 67 | 70 |

TABLE 8-continued

|  | A | B |
|---|---|---|
| Change % Tensile Strength | −9 | −12 |
| Change % Ult Elongation, | −43 | −39 |
| Change % Hardness, Shre A-2, Point charge | 8 | 10 |

Example 8 shows that:
1. 3-amino-2-naphthoic acid improved modulus and improved resistance to heat aging.
2. Ethyl p-amino benzoate improves heat aging, but reduces modulus.

EXAMPLE 9

This example shows the effects of sodium p-aminobenzoate, magnesium p-aminobenzoate, magnesium salicylate and zinc salicylate on chloroprene rubber properties. The rubber formulation of examples 5, 6, 7 and 8 was used. All compounds were added at a dosage of 1 part by weight.

The additives were ball-milled and added as dispersions consisting of 25% additive and 75% light process oil, by weight.

The results of example 9 are shown in Table 9, below.

TABLE 9

|  | A | B | C | D |
|---|---|---|---|---|
| Additive | Na p-amino-benzoate | Mg p-amino benzoate | Mg Sali-cylate | Zn Sali-cylate |
| Stress-strain and hardness, cured 20 minutes at 160° C. | | | | |
| Modulus @ 200%, MPa | 9.2 | 9.3 | 9.1 | 9.4 |
| Modulus @ 300%, MPa | 13.4 | 13.3 | 13.2 | 13.6 |
| Tensile strength, MPa | 16.8 | 17.1 | 16.9 | 16.7 |
| Ult. elongation, % | 430 | 440 | 460 | 440 |
| Hardness, Store A-2 | 80 | 80 | 78 | 76 |
| After test tube heat aging (5 days @ 121° C.) | | | | |
| Modulus @ 200%, change % | 66 | 50 | 52 | 49 |
| Tensile Strength, change % | −5 | −11 | −9 | −5 |
| Ult. Elongation, change % | −46 | −45 | −46 | −41 |
| Hardness, Shore A-2, Points Charge | 9 | 9 | 8 | 10 |

Example 9 shows that:
1. Na p-aminobenzoate improves heat aging resistance and modulus.
2. Mg p-aminobenzoate improves heat aging and modulus.
3. Mg salicylate improves heat aging and modulus.
4. Zn salicylate improves heat aging and modulus.

EXAMPLE 10

A dispersion was prepared using sodium p-amino benzoate, high activity magnesium oxide and light processing oil. Weight percent of the components were as follows:
Na p-amino benzoate—11.1%
MgO—22.2%
Light processing oil—66.7%

Initially, 154 grams LPO and 100 grams MgO were added to a mixer which was heated to maintain the temperature at 88° C., and these components were mixed until a homogeneous paste was obtained. 200 gms of a ball-milled dispersion consisting of 50 gms Na-p-aminobenzoate and 150 gms LPO was then added, and the combined product was mixed at 88° C. until a homogeneous paste was obtained.

The resulting product was a homogeneous dispersion containing Na-p-aminobenzoate. This product form is preferred by the rubber processing industry, due to ease of handling, elimination of dust and protection against attack by atmospheric moisture and/or carbon dioxide.

EXAMPLE 11

The dispersion test compound described in Example 10 was evaluated in the same Neoprene GNA formulation as used in Examples 5, 6, 7, 8 and 9.
Neoprene Compound A:
  Add MgO powder at a level of 2 parts.
  Add Na p-aminobenzoate at 1 part, using a 25% ball milled dispersion of Na p-aminobenzoate in LPO.
Neoprene Compound B:
  Add MgO at 2 parts and Na p-aminobenzoate at 1 part in the pre-dispersed compound described in Example 10.

Thus, Neoprene Compounds A and B have the same composition. In Compound A, MgO and Na P-aminobenzoate are added separately while in Compound B they are added together in a pre-dispersed mixture. Results are shown in Table 10, below.

TABLE 10

|  | A | B |
|---|---|---|
| Mooney scorch $t_{10}$ time @ 126.7° C., (minutes) | | |
| Original | 34 | 35 |
| After 6 days bin aging @ 50° C. | 33 | 33 |
| Original stress-strain and hardness, cured 20 minutes @ 160° C. | | |
| Modulus @ 200%, MPa | 9.2 | 9.4 |
| Modulus @ 300%, MPa | 13.4 | 13.4 |
| Tensile Strength, MPa | 16.8 | 17.1 |
| Ult. Elongation, % | 430 | 430 |
| Hardness, Shore A-2 | 80 | 80 |
| Changes after air test tube aging, 5 days @ 121° C. | | |
| Modulus @ 200%, Change % | 66 | 59 |
| Tensile Strength, Change % | −5 | −6 |
| Ult. Elongation, Change % | −46 | −47 |
| Hardness, Shore A-2, Points Change | 9 | 9 |

The results indicate that the pre-dispersed mixture of MgO and Na p-aminobenzoate shows similar modulus increase and similar scorch protection as Compound A in which MgO and Na p-aminobenzoate were added separately. The resistance to heat aging of Compound B is slightly better than Compound A. Both compounds A and B result in improved heat aging resistance and increased modulus when compared with the control compound which is Formulation A in Example 5.

Though this invention is primarily directed to halogen-containing rubbers, especially chloroprene rubbers, the inventor anticipates that the instantly defined heat aging additives will also show efficacy in terms of heat aging resistance when added with the following rubbers:
Natural Rubber
Synthetic Rubber:
  Styrene butadiene
  Polybutadiene Ethylene propylene, copolymer and terpolymer
Chlorinated high density polyethylene*
Nitrile
Butyl
Polyisoprene
Chlorobutyl*
Bromobutyl*
Chlorosulfonated polyethylene*
Fluorocarbon*
Polysulphide
Silicone
Polyurethane
Ethylene acrylic
Epichlorohydrin*
Ethylene vinylacetate
Thermoplastic copolyester.

*Halogen containing rubbers

What is claimed is:

1. A method of improving the heat aging properties of a vulcanized chloroprene rubber comprising adding an effective amount of a compound selected from the group consisting of anthranilic acid, meta aminobenzoic acid, para aminobenzoic acid, alkali metal salts of these acids, esters of these acids, halogen substituted alkali metal salts of these acids, halogen substituted anthranilic acid, halogen substituted meta aminobenzoic acid, halogen substituted para aminobenzoic acid, amino naphthoic acids, salts of amino naphthoic acids, esters of amino naphthoic acids, halogen substituted amino naphthoic acids, halogen substituted salts of amino naphthoic acids, amino phenyl alkyl carboxylic acids, amino phenyl alkyl carboxylic acid salts, esters of amino phenyl alkyl carboxylic acids, halogen substituted amino phenyl alkyl carboxylic acids, halogen substituted amino phenyl alkyl carboxylic acid salts and corresponding diphenyl compounds to said chloroprene rubber prior to vulcanization, and then vulcanizing.

2. The method of claim 1, wherein said effective amount is at least 0.01 part, by weight, per 100 parts of the chloroprene rubber being treated.

3. The method of claim 1, wherein said effective amount is from 0.1 part to 100 parts, by weight, per 100 parts of the chloroprene rubber being treated.

4. The method of claim 1, wherein said compound is selected from the group consisting of anthranilic acid, meta aminobenzoic acid, para aminobenzoic acid, 2-amino-4-chlorobenzoic acid, para amino phenyl acetic acid, magnesium p-aminobenzoate, ethyl ester of aminobenzoic acid, 3-amino-2-naphthoic acid, ethyl ester of p-aminobenzoic acid, sodium-p-aminobenzoate, calcium p-amino-benzoate, zinc p-aminobenzoate, 4,4-diamino-1,1-diphenyl-3,3-dicarboxylic acid and its sodium salt.

5. The method of claim 4, wherein said compound is selected from the group consisting of anthranilic acid, meta-aminobenzoic acid, para-amino-benzoic acid, para-aminophenyl acetic acid, magnesium para-aminobenzoate, and sodium p-aminobenzoate.

6. A composition for producing a vulcanized chloroprene rubber having improved heat aging qualities comprising: (a) an unvulcanized chloroprene rubber; and (b) a compound selected from the group consisting of: anthranilic acid, meta aminobenzoic acid, para aminobenzoic acid, alkali metal salts of these acids, esters of these acids, halogen substituted alkali metal salts of these acids, halogen substituted anthranilic acid, halogen substituted meta aminobenzoic acid, halogen substituted para aminobenzoic acid, amino naphthoic acids, salts of amino naphthoic acids, esters of amino naphthoic acids, halogen substituted amino naphthoic acids, halogen substituted salts of amino naphthoic acids, amino phenyl alkyl carboxylic acids, amino phenyl alkyl carboxylic acid salts, esters of amino phenyl alkyl carboxylic acids, halogen substituted amino phenyl alkyl carboxylic acids, halogen substituted amino phenyl alkyl carboxylic acid salts and corresponding diphenyl compounds; wherein said compound is added at a dosage of at least 0.01 part, by weight, per 100 parts of said unvulcanized chloroprene rubber.

7. The composition of claim 6, wherein said compound is present at a dosage of from 0.1 part to 100 parts by weight, per part of said unvulcanized chloroprene rubber.

8. The composition of claim 6, wherein said compound is selected from the group consisting of anthranilic acid, meta aminobenzoic acid, para aminobenzoic acid, 2-amino-4-chlorobenzoic acid, para amino phenyl acetic acid, magnesium p-aminobenzoate, ethyl ester of aminobenzoic acid, 3-amino-2-naphthoic acid, ethyl ester of p-aminobenzoic acid, sodium-p-aminobenzoate, calcium p-amino-benzoate, zinc p-aminobenzoate, 4,4-diamino-1,1-diphenyl-3,3-dicarboxylic acid and its sodium salt.

9. The composition of claim 8, wherein said compound is selected from the group consisting of anthranilic acid, meta-aminobenzoic acid, para-amino-benzoic acid, para-aminophenyl acetic acid, magnesium para-aminobenzoate, and sodium p-aminobenzoate.

10. The composition of claim 6, which additionally comprises: (a) a vulcanizing agent; (b) an antiscorching agent; (c) an accelerating agent and (d) an antioxidant.

11. The composition of claim 10, which additionally comprises: (a) a filler; (b) a plasticizer; (c) a lubricant; or (d) some combination of (a), (b) and (c).

12. An improved vulcanized chloroprene rubber containing at least 0.1 part, by weight, per 100 parts of chloroprene of a compound selected from the group consisting of: anthranilic acid, meta aminobenzoic acid, para aminobenzoic acid, alkali metal salts of these acids, esters of these acids, halogen substituted alkali metal salts of these acids, halogen substituted anthranilic acid, halogen substituted meta aminobenzoic acid, halogen substituted para aminobenzoic acid, amino naphthoic acids, salts of amino naphthoic acids, esters of amino naphthoic acids, halogen substituted amino naphthoic acids, halogen substituted salts of amino naphthoic acids, amino phenyl alkyl carboxylic acids, amino phenyl alkyl carboxylic acid salts, esters of amino phenyl alkyl carboxylic acids, halogen substituted amino phenyl alkyl carboxylic acids, halogen substituted amino phenyl alkyl carboxylic acid salts, and corresponding diphenyl compounds.

* * * * *